April 5, 1932.  H. W. McCREARY ET AL  1,852,249
ANIMAL TRAP
Filed June 21, 1930
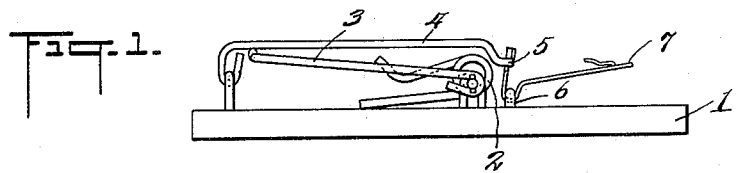
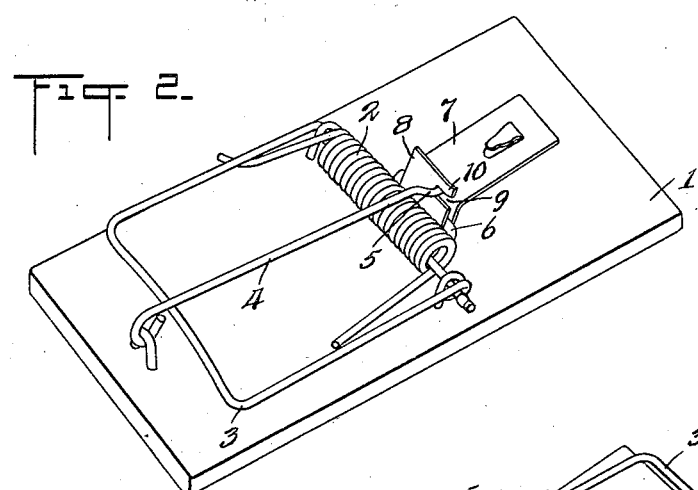
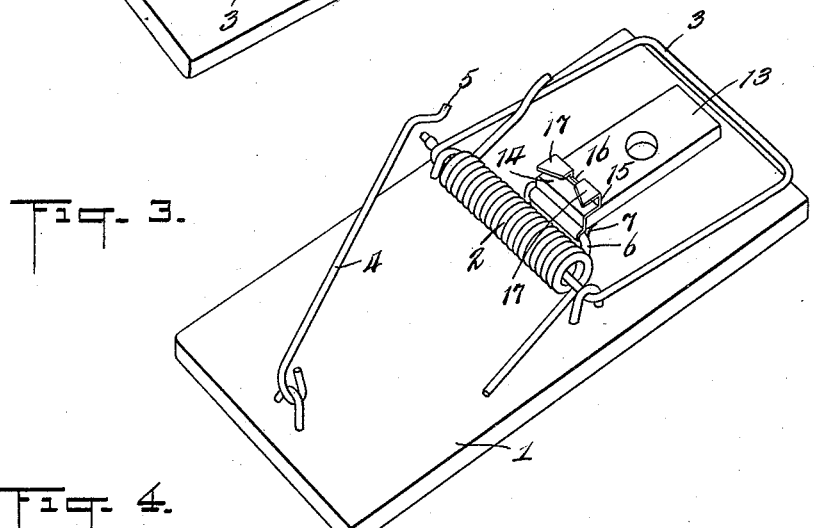
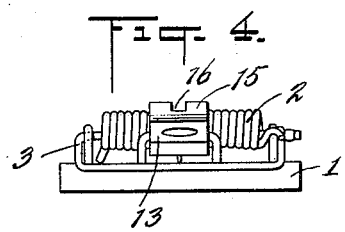
INVENTORS
HARRY W. McCREARY & JOSEPH D. ZAHM.
BY
ATTORNEYS Patented Apr. 5, 1932

1,852,249

UNITED STATES PATENT OFFICE

HARRY W. McCREARY AND JOSEPH D. ZAHM, OF LITITZ, PENNSYLVANIA, ASSIGNORS TO ANIMAL TRAP COMPANY OF AMERICA, OF LITITZ, PENNSYLVANIA, A CORPORATION OF PENNSYLVANIA

ANIMAL TRAP

Application filed June 21, 1930. Serial No. 462,717.

This invention relates to spring actuated animal traps and has for its main object the provision of an improved form of such trap which will require less movement on the part of the animal to spring the same.

More specifically it is an object of the invention to provide a spring actuated trap having a trigger member comprising an upstanding portion having a slot and a lip which lies at an angle to the plane thereof, one edge of the lip forming one edge of the slot and being at an angle to the retaining lever when the same is in the set position.

Further objects and features of the invention will be apparent from the description given hereinafter.

By way of example, we illustrate in the accompanying drawings two embodiments of the invention, and in the drawings Figure 1 is a side elevation of one convenient form of trap, the trap being in the set position;

Figure 2 is a perspective view of the trap shown in Figure 1;

Figure 3 is a perspective view of a modification, the trap being in the sprung position; and Figure 4 is an end on view of the trap shown in Figure 3, in the same condition.

In the drawings like references denote like parts and in both embodiments there is provided a base 1 preferably made of wood and carrying a spring 2, a jaw member 3 and a retaining lever 4 all of well known construction. The end of the retaining lever is bent down as at 5.

In the embodiments shown in Figures 1 and 2, loosely pivoted, as by a staple 6 fixed in the base 1, there is a trigger member 7. The trigger member has an upstanding portion 8 and in one side or edge thereof is a slot 9 in which the end 5 of the lever 4 is adapted to be placed when the trap is set. A part of the upstanding portion 8 comprising a lug or lip 10 is bent back at an angle to the plane of the upstanding portion so that one edge of the lug or lip forms one edge of the slot or aperture 9. In this arrangement the actual surface which makes contact with the end 5 is inclined or at an angle to the length of the lever.

In operation if the animal depresses the end of the trigger member 7 relative movement between the lip 10 and the lever 4 causes the lever to be released by virtue of the inclined edge of the slot 9 and in this manner the trap is made exceedingly sensitive. If the animal raises the end of the trigger in taking the bait, the inclined edge of the slot 9 causes the retaining lever to be released by being thrown out beyond the end of the slot.

In the embodiment illustrated in Figures 3 and 4, the trigger member 7 is attached to the staple 6 and carries a piece of wood 13. Over the end of the piece 13, adjacent to the spring, is a metallic part of the trigger 14 having an upstanding portion 15 and in this upstanding portion is a central slot 16 on each side of which is a lug or lip 17. The edges of the lips 17 form the edges of the slot 16 and they are inclined or are at an angle to the length of the retaining lever 4 when the same is in the set position.

In operation the end 5 of the retaining lever is placed under one of the lips 17 and relative movement between the two caused by the animal depressing or raising the block of wood 13, causes the inclined surface illustrated in Figure 3 to release the end of the lever, and in this way the trap is sprung.

It is obvious that various modifications may be made within the spirit of the invention and the same is not to be limited to the specific embodiment illustrated in the drawings but is set out in the appended claims.

We claim:—

1. A spring actuated animal trap comprising a jaw, a retaining lever and a trigger member comprising an upstanding portion said portion having a slot and a lip which lies at an angle to the plane of said upstanding portion, one edge of said lip forming one edge of said slot and being inclined out of said plane at an angle to said lever when the same contacts therewith to set the trap, said contact being between said lever and said inclined edge.

2. An animal trap comprising a spring actuated jaw member, a loosely pivoted lever to hold said jaw member in its set position, a trigger member pivoted on a horizontal axis and having an upstanding portion beyond the end of said lever said upstanding portion having an aperture at one side thereof, a lip on said portion whose lower edge forms an upper edge of said aperture and turned away from the end of said lever out of the plane of the upstanding portion, said lever contacting directly with said turned away edge in the set position.

3. An animal trap comprising a spring actuated jaw member, a loosely pivoted lever to hold said jaw member in its set position, a trigger member pivoted on a horizontal axis and having an upstanding portion beyond the end of said lever, said upstanding portion having a slot and lips lying in a plane at an angle thereto, one edge of each lip forming one edge of the slot and being at an angle to the plane of said upstanding portion and to said lever in the set position.

In testimony whereof we affix our signatures.

HARRY W. McCREARY.
JOSEPH D. ZAHM.